United States Patent
Moser

(10) Patent No.: US 7,566,203 B2
(45) Date of Patent: Jul. 28, 2009

(54) ROTOR BLADE

(76) Inventor: Josef Moser, Erlenstrasse2, D-85435 Erding/Pretzen (DE)

( * ) Notice: Subject to any disclaimer, the term of this patent is extended or adjusted under 35 U.S.C. 154(b) by 493 days.

(21) Appl. No.: 11/190,548

(22) Filed: Jul. 27, 2005

(65) Prior Publication Data

US 2006/0018759 A1    Jan. 26, 2006

(30) Foreign Application Priority Data

Jan. 30, 2003 (DE) .................. 203 01 445 U

(51) Int. Cl.
*B63H 1/26* (2006.01)

(52) U.S. Cl. .................. 416/235; 416/236 R

(58) Field of Classification Search .......... 416/228, 416/235, 236 R, 236 A, 237
See application file for complete search history.

(56) References Cited

U.S. PATENT DOCUMENTS

| | | | | |
|---|---|---|---|---|
| 2,010,094 A | * | 8/1935 | Leinweber | 416/236 R |
| 2,110,621 A | * | 3/1938 | Cohen | 392/362 |
| 2,238,749 A | | 4/1941 | Peltier | |
| 2,265,788 A | * | 12/1941 | Wolf et al. | 416/236 R |
| 3,166,129 A | | 1/1965 | Bryan | |
| 4,324,530 A | | 4/1982 | Fradenburgh et al. | |
| 4,329,115 A | | 5/1982 | Kress | |
| 4,830,315 A | * | 5/1989 | Presz et al. | 244/200 |
| 4,886,421 A | * | 12/1989 | Danson | 416/236 R |
| 5,217,349 A | | 6/1993 | Succi | |
| 5,775,876 A | * | 7/1998 | Walker et al. | 416/62 |
| 5,860,626 A | | 1/1999 | Moser | |
| 6,132,181 A | * | 10/2000 | McCabe | 417/334 |

FOREIGN PATENT DOCUMENTS

| | | |
|---|---|---|
| DE | 588 392 | 11/1933 |
| DE | 830 627 | 2/1952 |
| DE | 888 959 | 9/1953 |
| DE | 31 50 604 A1 | 6/1983 |
| DE | 42 01 425 A1 | 7/1993 |
| EP | 0 018 114 | 10/1980 |
| EP | 724 691 B1 | 8/1996 |
| GB | 109 150 | 9/1917 |
| GB | 791 563 | 3/1958 |
| GB | 2 175 351 A | 11/1986 |
| GB | 2 374 331 A | 10/2002 |
| WO | WO 92/05341 | 4/1992 |

* cited by examiner

*Primary Examiner*—Igor Kershteyn
(74) *Attorney, Agent, or Firm*—Carter, DeLuca, Farrell & Schmidt LLP

(57) ABSTRACT

The invention relates to a rotor blade, preferably for use in a wind turbine, comprising a rotor wing. In accordance with the invention, at least one shaped member projecting beyond the surface of the rotor wing is arranged close to the free end of the rotor wing.

14 Claims, 14 Drawing Sheets

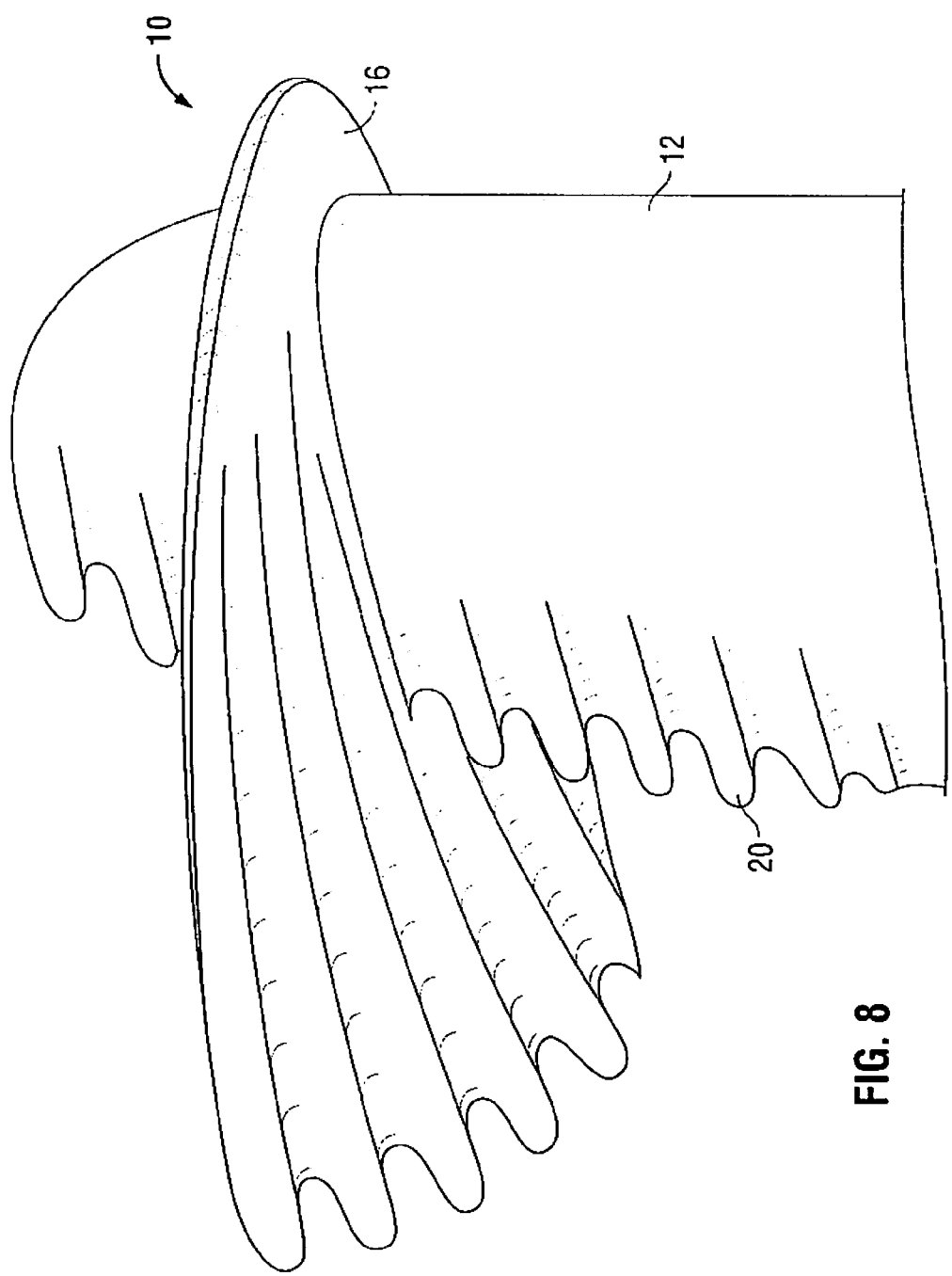

ROTOR BLADE

Figure 1:
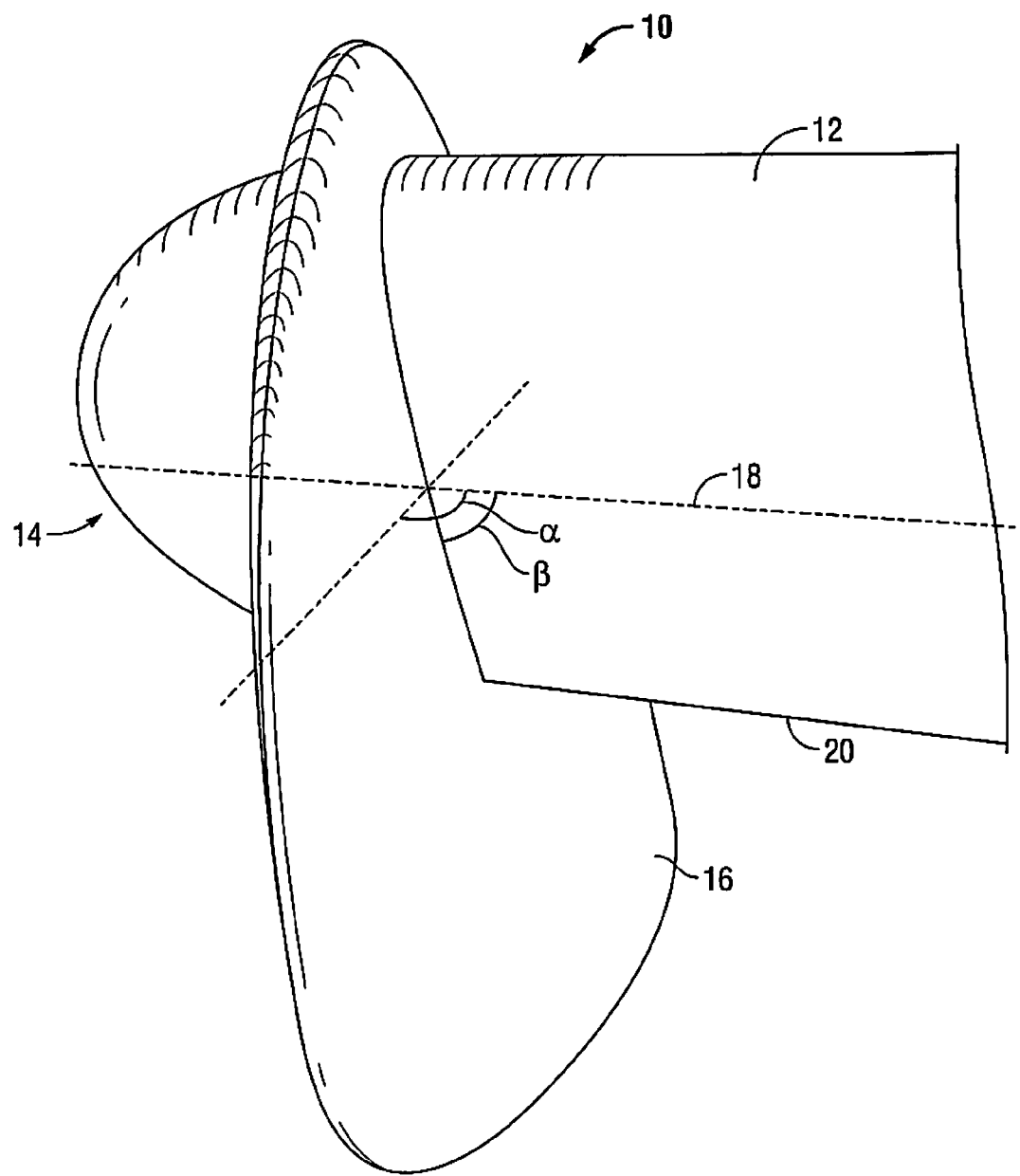

The invention relates to a rotor blade such as is preferably used in a wind turbine.

The performance of wind power stations such as are used today for the generation of electrical energy depends on a series of factors, namely among others in particular on the wind speed, the circumferential speed, the lift forces and the drag forces.

The suitable wind turbine type has to be selected in accordance with the prevailing wind conditions and performance requirements.

All wind power stations share a common economic characteristic curve which results from the local conditions and from the power yield which is in turn dependent on the constructional design. A factor of great importance is the design of the rotor blades of the wind turbine. This design is an important factor in the efficiency calculation, with it being the goal to take up and convert the available wind power as efficiently as possible.

The most frequently used rotor designs in wind turbines include the so-called propellers. These rotors, which essentially have a horizontal axis and which are already largely optimized aerodynamically, produce a comparatively high power. Up to 48% of the supplied wind power can generally be converted into available mechanical or electrical work. Many endeavors have been made to optimize the shape of wind turbines.

It was thus, for example, proposed in DE 42 01 425 C2 to design the wind-capturing part of a rotor blade partly in channel shape or shell shape. A rotor blade for a wind turbine is known from DE 31 50 604 A1 in which the wind-engaging surface consists of a flap and a wind-guiding blade connected thereto and arranged obliquely to the flap, with the flap being pivotable with the wind-guiding blade about an axis perpendicular to the longitudinal axis of the rotor arm out of a closed position parallel to the longitudinal axis of the rotor arm into an open position towards the rotor arm.

It is the object of the invention to further develop a known wind rotor blade such that the efficiency of the wind power made available by the wind rotor blade is improved.

This object is solved in accordance with the invention by a wind rotor blade having the features of claim 1. Accordingly, the wind rotor blade consists of a conventionally shaped rotor wing which, in accordance with the invention, has at least one shaped member arranged close to the free end of the rotor wing and projecting beyond the surface of the rotor wing.

This shaped member serves the prevention of vortex trailing forming at the rotor blade tip, on the one hand. On the other hand, it serves to additionally utilize the tangential flow flowing outwardly along the rotor blade for the propelling of the rotor.

Special advantages of the invention result from the dependent claims following on from the main claim.

Accordingly, the shaped member is made as an aerodynamically shape-matched plate which is set at an angle $\alpha \geq 90°$ to the wind rotor blade surface. The shaped member can additionally be made as an aerodynamically shape-matched plate which is set at an angle $\beta \leq 90°$ within the plane set up by the wind rotor blade with respect to the longitudinal axis of the rotor (cf. FIG. 1). The rotor blade can advantageously consist of a plastic shaped member, for example of a composite material.

In order to optimize the alignment of the shaped member, a corresponding adjustment mechanism can be provided via which the shaped member is variable with respect to the rotor blade with respect to its corresponding alignment to the rotor blade.

In accordance with a further preferred aspect of the invention, a plurality of shaped members can be arranged next to one another along the rotor blade.

Finally, the rotor blade surface can have elevated portions and/or recessed portions. These elevated portions are quite particularly advantageously shaped in accordance with EP 07 24 691 B1.

The shaped member(s), which is/are arranged in the end region of the rotor wing, can also be formed by a correspondingly wavy shape in the region of the free end of the rotor wing at the rear edge of the rotor wing. In this case, an additional shaped member aligned perpendicular to the wing does not necessarily have to be provided. The shaped member is rather formed here by the corresponding wave movement in the rear edge region of the rotor wing.

The rotor blade, which was previously described as a wind rotor blade, can advantageously also be used as a helicopter rotor after a corresponding adaptation of dimensions.

Figure 2:
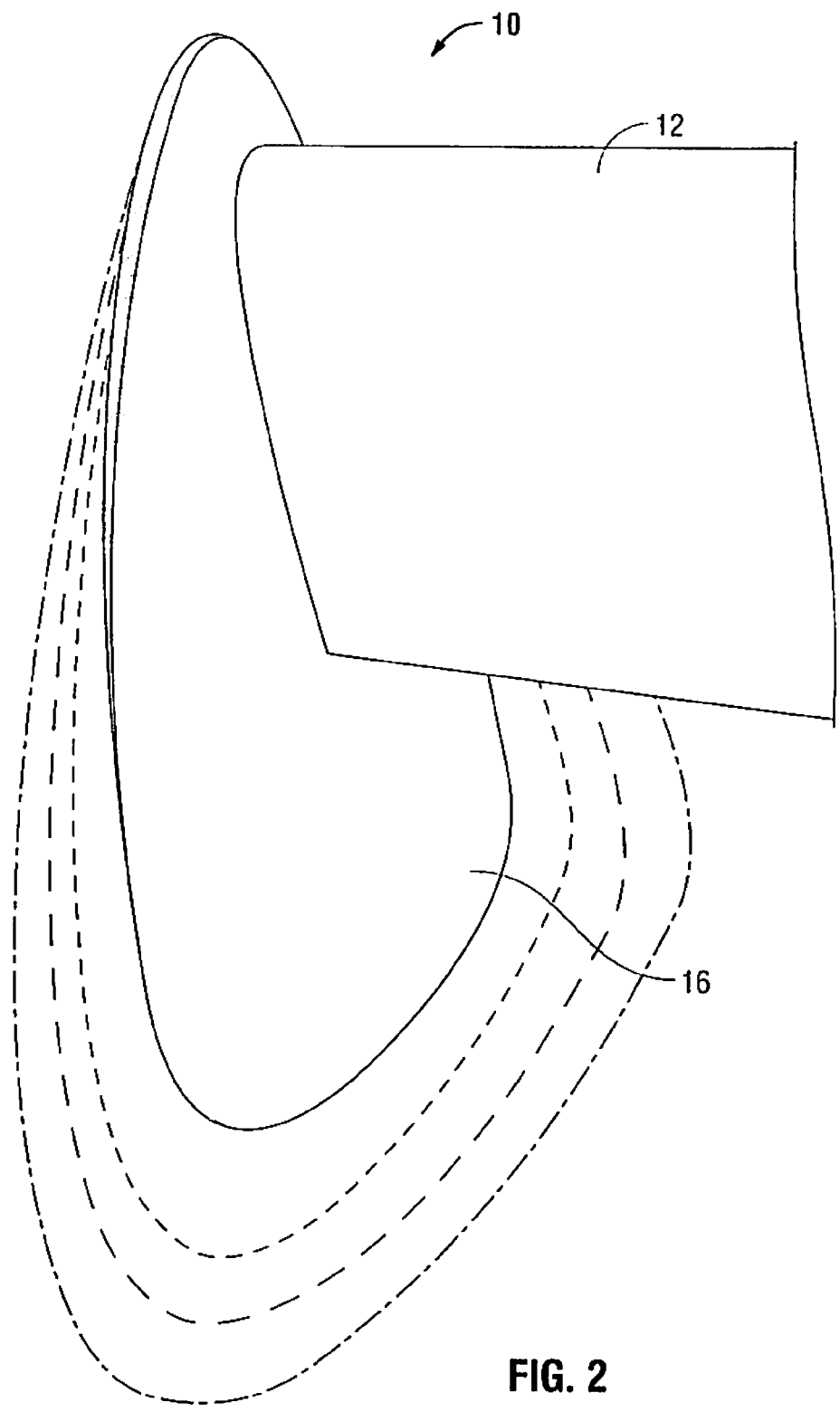
Figure 3:
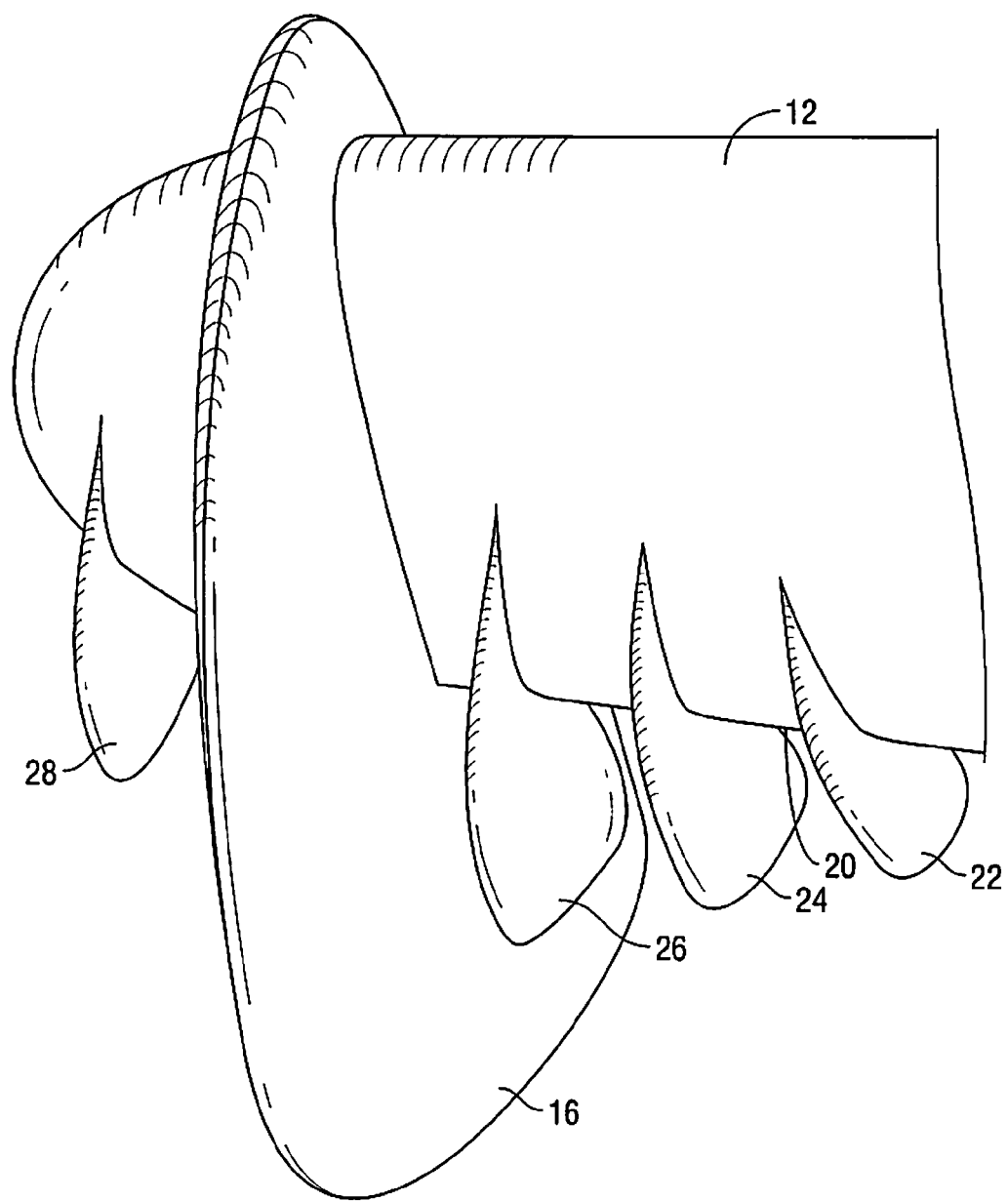
Figure 4:
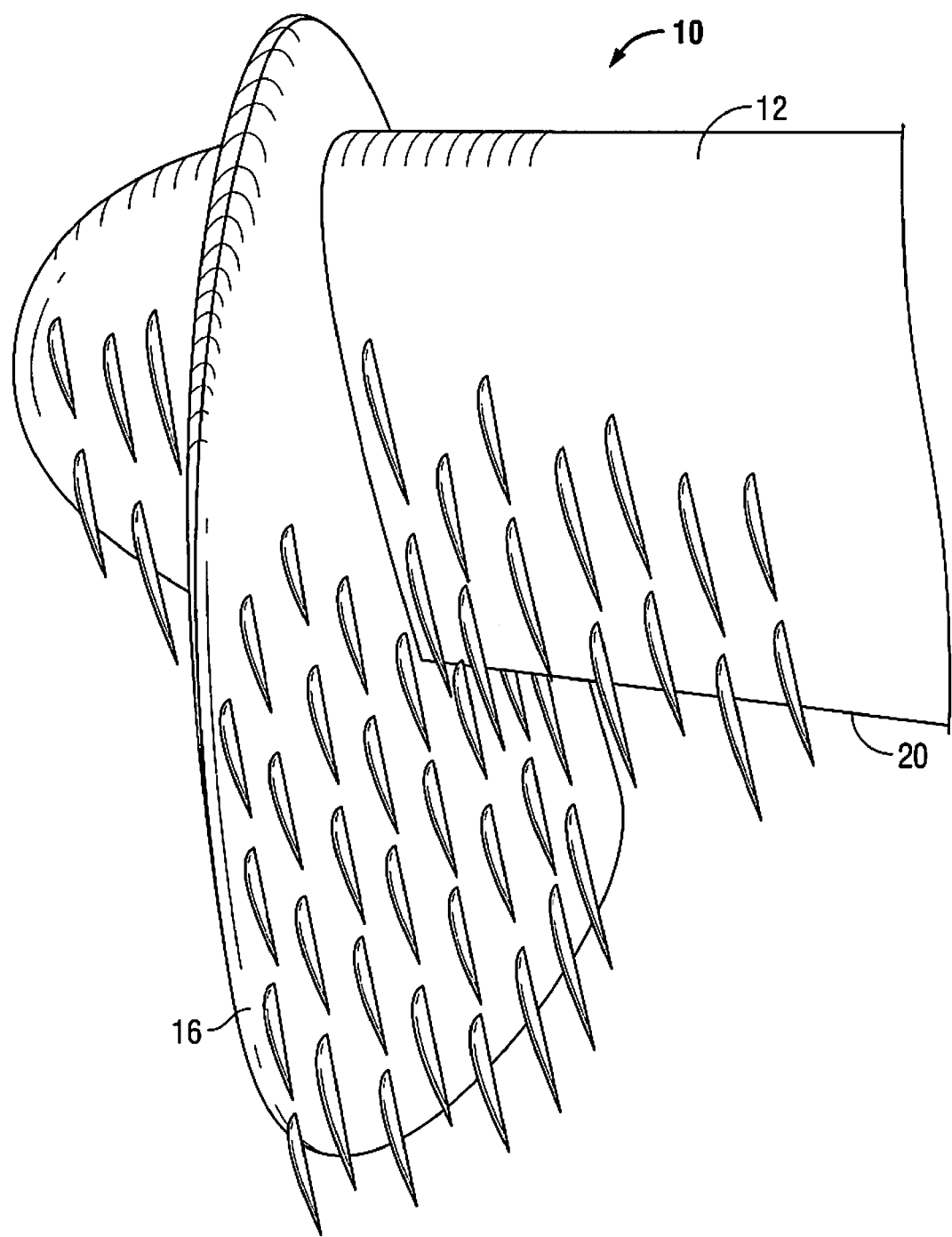
Figure 5A:
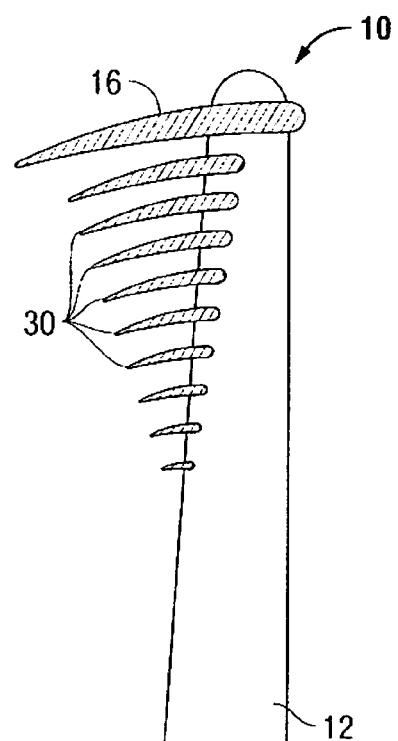
Figure 5B:
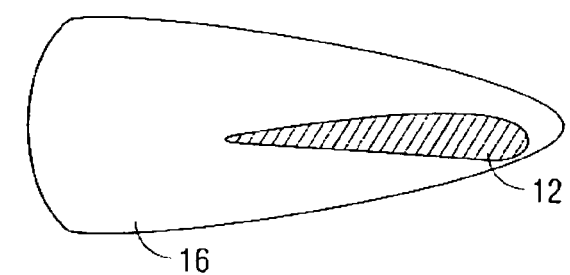
Figure 5C:
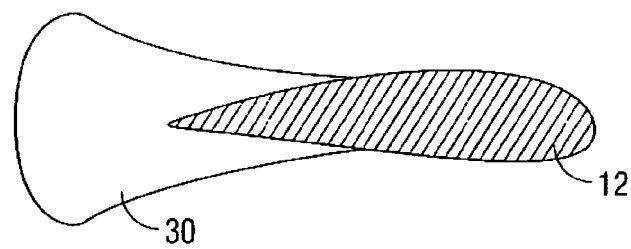
Figure 5D:
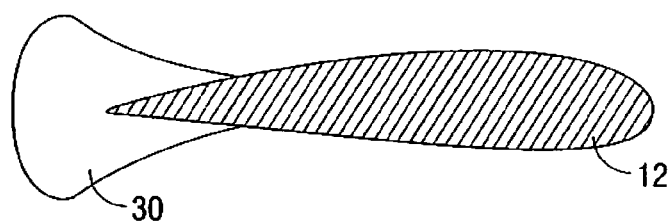
Figure 6:
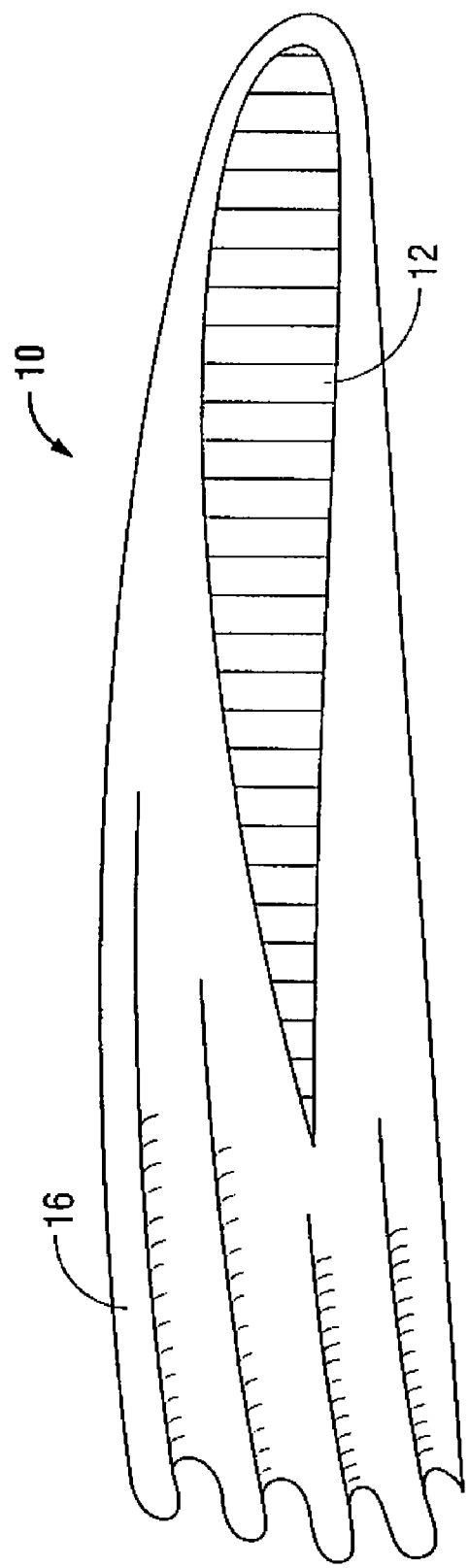
Figure 9A:
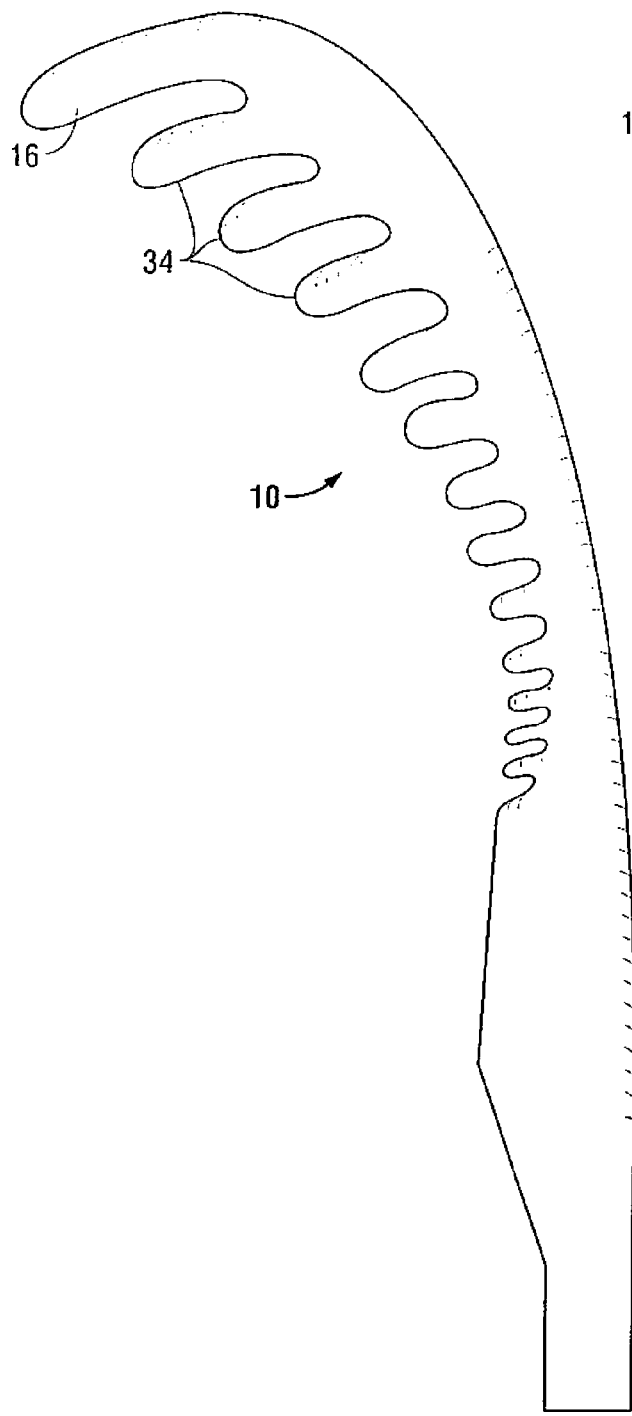
Figure 9B:
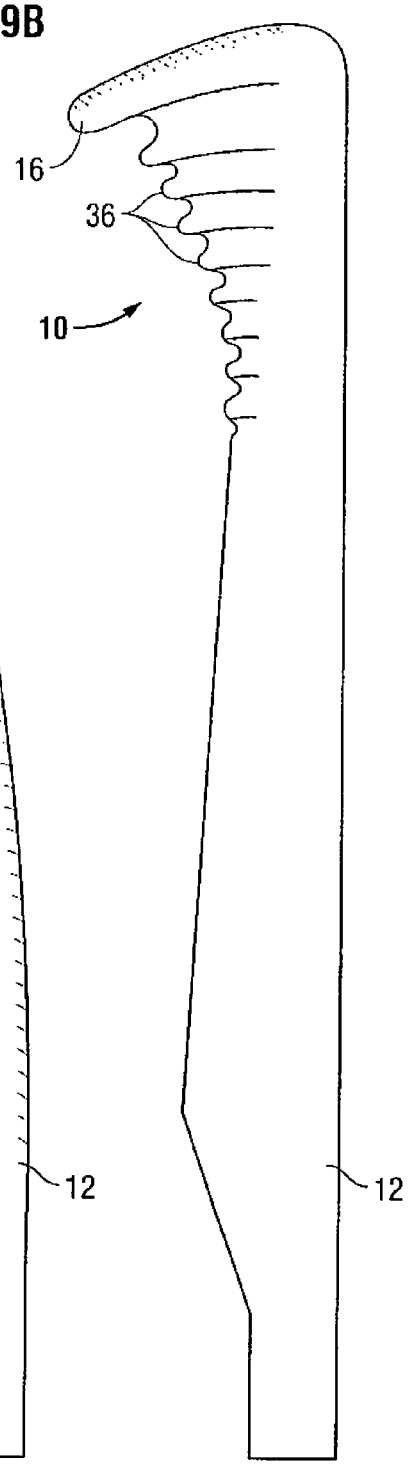
Figure 11:
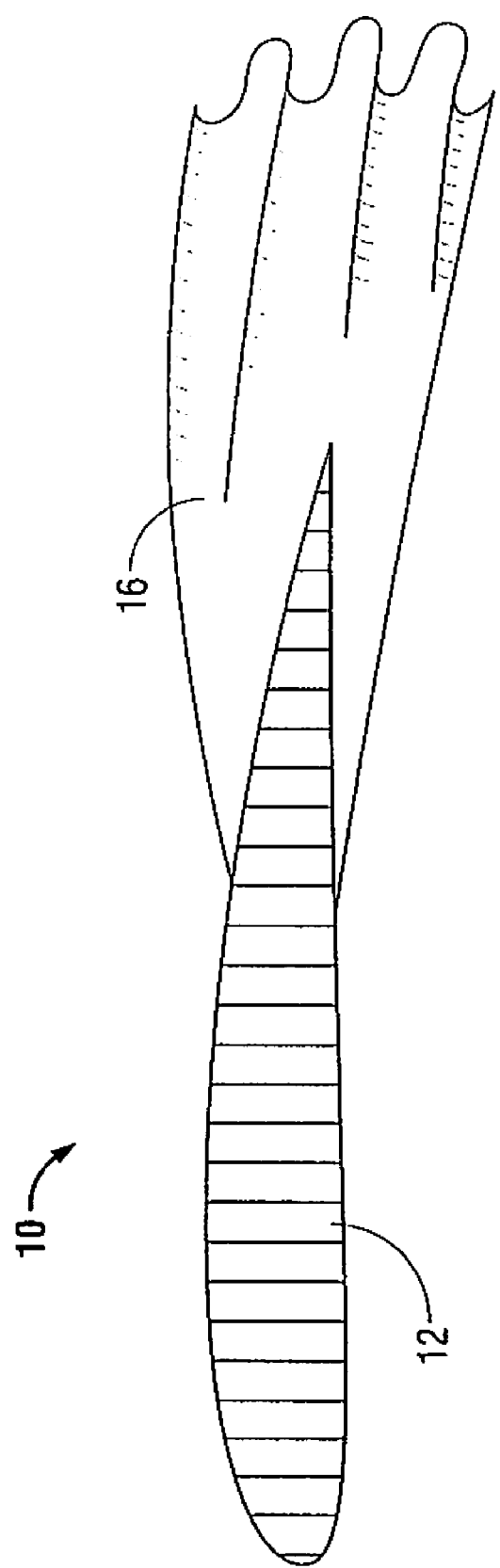
Figure 12:
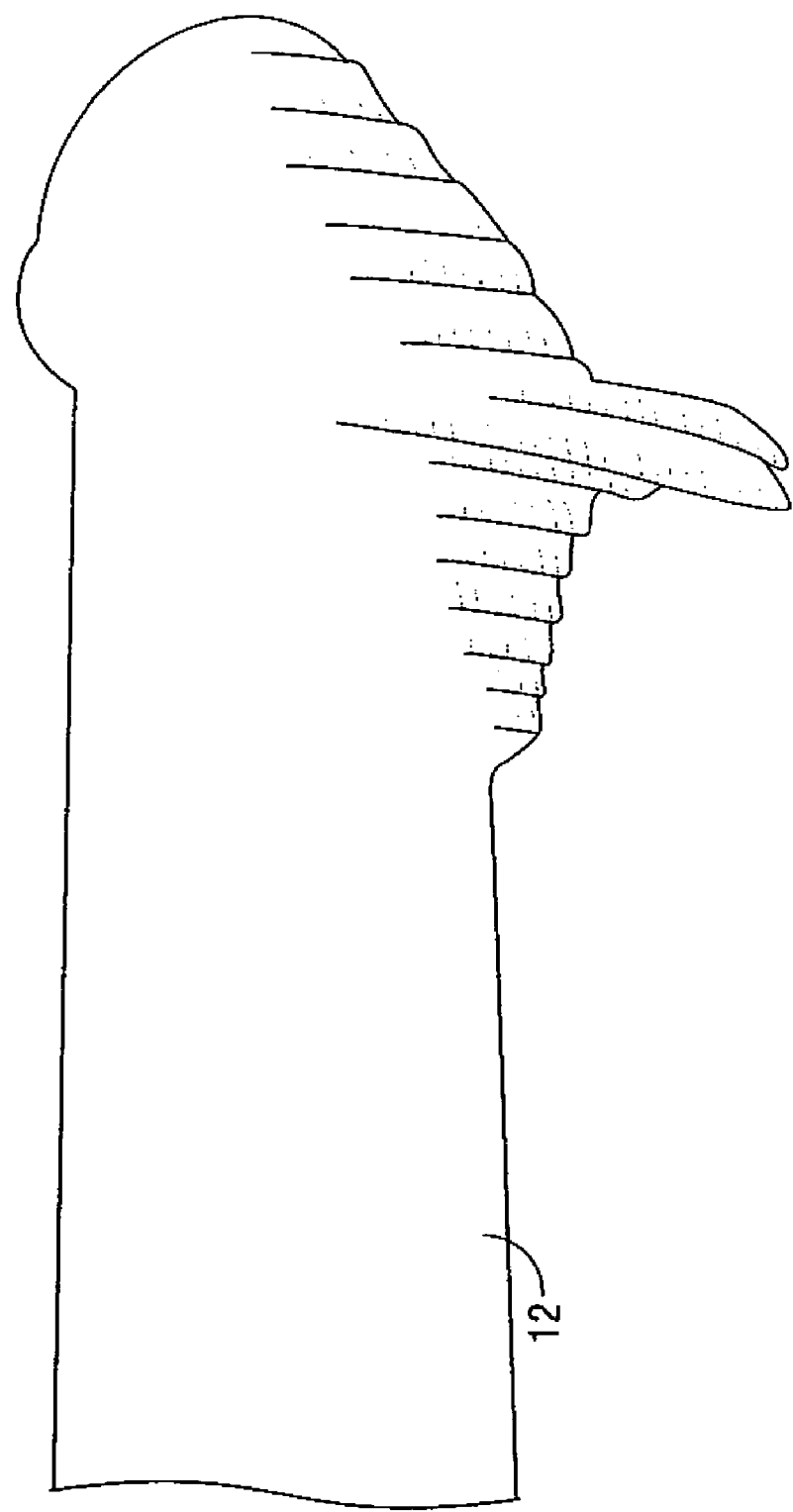
Figure 13:
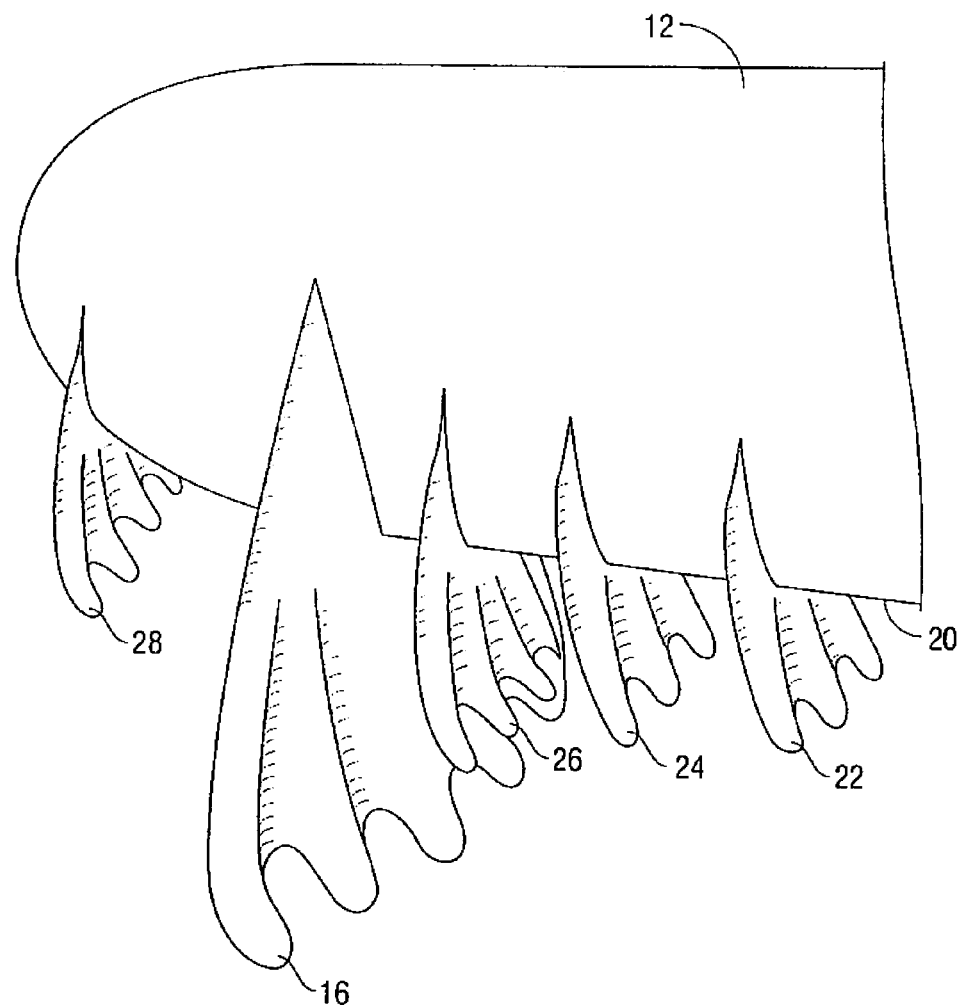

Further aspects and advantages of the invention will be explained in more detail with respect to an embodiment shown in the drawing. There are shown:

FIG. 1: a part of a rotor blade in accordance with the invention in a perspective representation;

FIG. 2: a representation in accordance with FIG. 1 with a shaped member of different size indicated in the contour;

FIG. 3: a modification of the embodiment of FIG. 1 with an additionally arranged shaped member;

FIG. 4: a schematically illustrated variation of the rotor blade in accordance with the invention with a surface having elevated portions;

FIG. 5A-D: a plan view and a plurality of sectional views of a modified embodiment variant of the rotor blade in accordance with the invention;

FIG. 6: a further embodiment variant of the rotor blade in accordance with the invention in cross-section;

FIG. 7A-D: plan views and two cross-sections through a further embodiment variant of the rotor blade in accordance with the invention;

FIG. 8: a perspective representation of a further embodiment of the rotor blade in accordance with the invention;

FIG. 9A-B: a plan view of two further modifications of the rotor blade in accordance with the invention in a schematic representation;

FIG. 10A-10D: a plan view and a plurality of sectional views of an embodiment variant which is similar to that of FIG. 5;

FIG. 11: a further embodiment variant of the rotor blade in accordance with the invention in cross-section which is similar to that of FIG. 6;

FIG. 12: a plan view of another embodiment of the present invention;

FIG. 13: yet another embodiment of the invention; and

Figure 14:
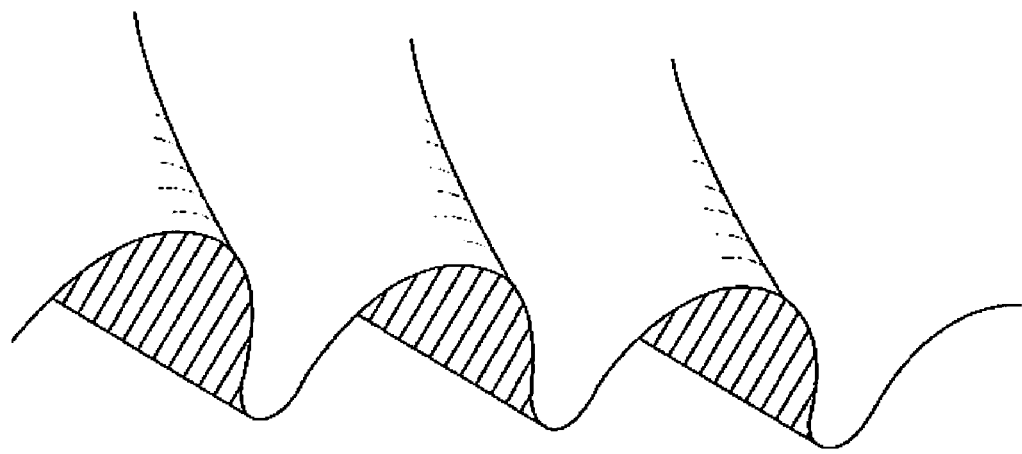
Figure 15:
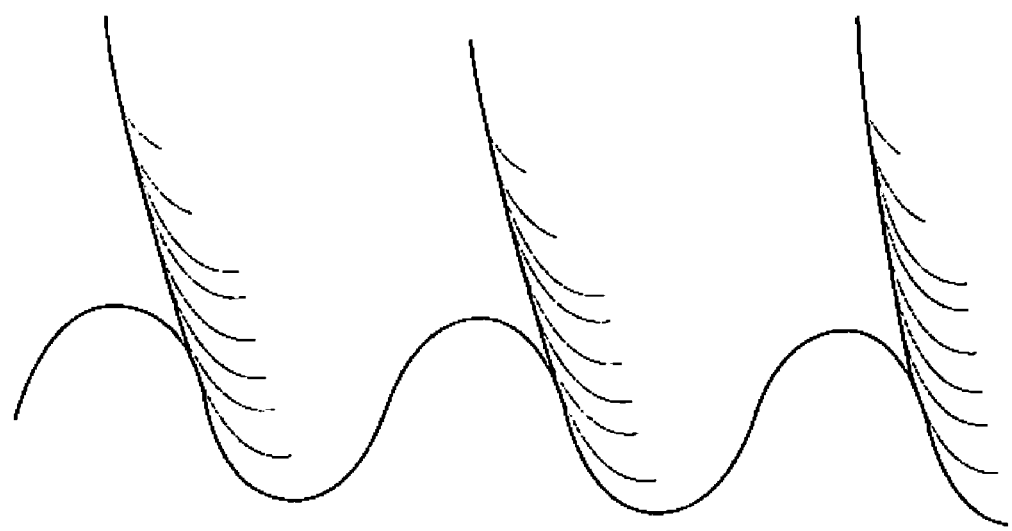

FIGS. 14, 15: a schematic representation of the wave formation of corresponding shaped members provided at the rotor blade or of the wave form of partial regions of the rotor blade itself.

As shown in FIG. 1, the rotor blade 10 in accordance with the present invention consists of a rotor wing 12 of conventional construction such as is used in wind propellers of commercial wind power stations. In accordance with the invention, a shaped member 16 which projects beyond the surface of the rotor wing is arranged close to the free end 14 of the rotor wing. As can in particular be seen from FIG. 1, this shaped member 16 consists of an aerodynamically shape-matched plate which projects beyond the rotor wing 12 at all sides, with the shaped member having, in simplified terms, the shape of a triangle with rounded corners.

It can be seen from FIG. 2 that the shape of the shaped member 16 can vary. A comparatively narrow shaped member is shown in solid line which can, however, also adopt a shape corresponding to the respective differently dotted lines. The shaped member 16 is, as shown in FIG. 1, set at an angle $\alpha \geqq 90°$ to the wind rotor blade surface. This means that the centre plane extending through the shaped member can be set slightly obliquely with respect to the plane defined by the rotor wing 12, that is it either stands perpendicular or tilts away slightly outwardly. On the other hand, the corresponding shaped member 16 can be set around an angle $\beta \leqq 90°$ inside the plane set up by the rotor blade with respect to the longitudinal axis of the rotor, with the orientation of the angle $\beta$ being shown in FIG. 1, that is—starting from the longitudinal axis 18 of the rotor—in the direction toward the rear edge 20 of the rotor wing 12. This in turn means that the shaped member 16 can be slightly inwardly inclined in the direction towards the rear end 20 of the rotor wing 12.

In the embodiment shown in FIG. 3, a series of smaller shaped members 22, 24, 26 and 28 mounted on the rotor wing 12 in the region of its rear edge 20 next to the shaped member 16, with them each being arranged parallel to the shaped member. In accordance with the embodiment variant shown in FIG. 4, the wind rotor blade 10 in accordance with FIG. 1 is provided with a surface such as is known from EP 724 691 B1 to which reference is made here with respect to content. The representation in accordance with FIG. 4 is only schematic here. The tangential flow forces close to the surface are additionally used for the propelling of the wing by this additional surface.

A further alternative aspect of the present invention results from the rotor blade 10 in accordance with FIG. 5A-D. It becomes clear in the plan view that a series of smaller shaped members 30 are arranged next to the shaped member 16, with these shaped members having a different shape, as the sections in accordance with FIGS. 5B, 5C and 5D transversely through the rotor wing 12 show (not to scale here).

In the aspect in accordance with FIG. 6, the rear region of the shaped member 16 is made in wave shape. Otherwise, the rotor blade 10 substantially corresponds to FIG. 1.

Figure 7C:
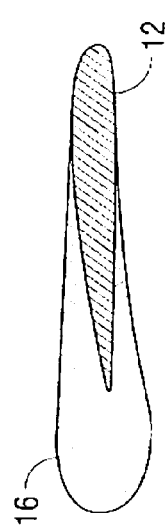
Figure 7D:
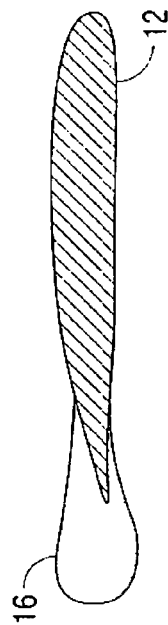
Figure 7B:
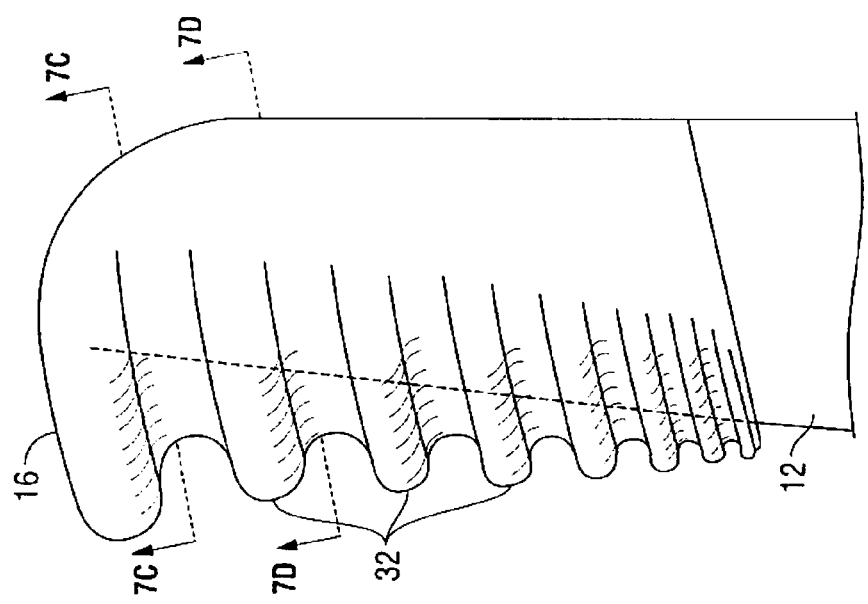
Figure 7A:
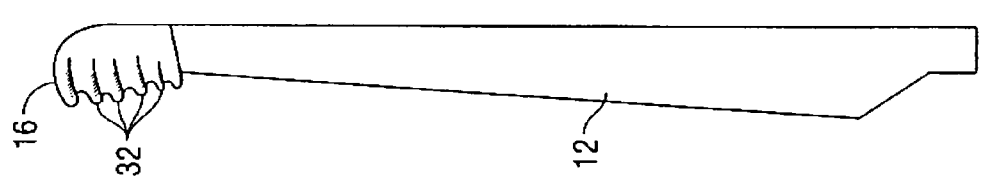

An embodiment is shown in FIGS. 7a and 7b in which the shaped member 16 and shaped members 32 arranged parallel thereto are applied to a conventional rotor wing 12 by means of a "glove". This embodiment variant is particularly suitable for the retrofitting of a conventional rotor wing 12. Respective cross-sections through the plan views of the rotor wing parts 12 shown in FIGS. 7a and 7b are shown in FIGS. 7c and 7d.

The embodiment of a rotor blade shown in FIG. 8 substantially corresponds to the shape shown in FIG. 1 with a rotor wing 12 and a shaped member 16, but with the respective rear edge regions 20 of the rotor wing 12 and the rear region of the shaped member 16 being designed in wave form. In accordance with the rotor blades 10 shown in FIGS. 9a and 9b, the respective overall contours of the rotor wing 12 are fused with the shaped members 16 and the shaped members 34 and 36 arranged parallel thereto to form an integrated overall shape.

Figure 10A:
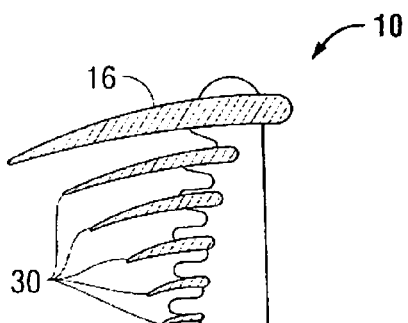
Figure 10B:
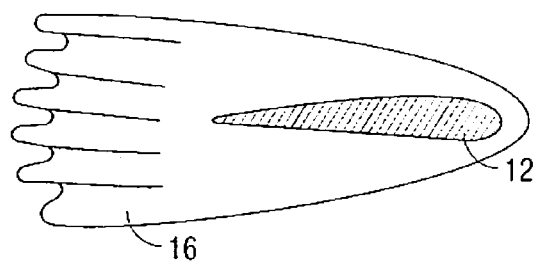
Figure 10C:
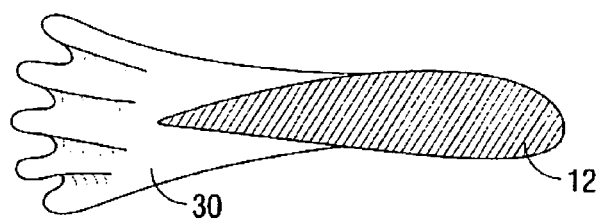
Figure 10D:
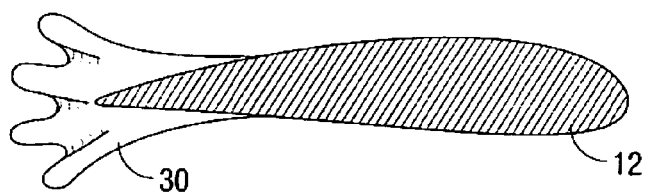

In FIG. 10A-10D a rotor blade 10 with a rotor wing 12 is shown. Similar to the embodiment variant in accordance with FIG. 5, a series of smaller shaped members 30 are arranged next to larger shaped member, with these shaped members having a different shape, as the sections transversely through the rotor wing 12 in accordance with FIGS. 10B, 10C and 10D show (not to scale here). The corresponding shaped members 16 and 30 are, as shown here, made in wave form and differ from those in accordance with the embodiment of FIG. 5 in that they are made essentially smooth.

Furthermore, the rotor wing 12 is also made in wave form in the region of the rear edge 20, as indicated in FIG. 10A, with the wave shape being reproduced by way of example in FIGS. 14 and 15, that is only being shown in simplified form in FIG. 10.

It is important in the waves that they are also again curved in themselves so that they follow the wing shape and so that they are only formed in the region of the rear edge 20 and do not extend over the total width of the rotor wing 12.

The embodiment variant in accordance with FIG. 11 largely corresponds to that in accordance with FIG. 6. The shaped member 16 is also designed in wave shape here, with it, however, only starting in the rear region of the rotor wing 12 and, unlike the embodiment in accordance with FIG. 6, not completely surrounding it.

FIG. 12 shows a further aspect of the present invention which is arranged in the end region of the rotor wing and in which the shaped members are made in the form of waves such as are shown, for example, with reference to FIGS. 14 and 15. The waves can be of different length, as is shown here. It also becomes clear here that the waves are only made in the rear edge region of the rotor wing 12. A projecting and rounded part of a wing edge can be formed in the front edge region, with this feature being optional. The corresponding waves can be comparatively coarser or finer. The representation in accordance with FIG. 12 only gives an indication of this here.

An embodiment variant is shown in FIG. 13 which substantially corresponds to that in accordance with FIG. 3, with a series of smaller shaped members 22, 24, 26 and 28, however, being formed here in the region of the rear edge of the rotor wing 12 next to the shaped member 16 and, unlike the embodiment in accordance with FIG. 3, likewise being wavy, as shown in FIG. 13.

The invention claimed is:

1. A rotor blade, for use in a wind turbine, comprising a rotor wing having a longitudinal axis along the length of the rotor wing and an axis transverse to the longitudinal axis, the transverse axis extending between a front edge and a rear edge of the rotor wing; and
   at least one shaped member arranged close to a free end of the rotor wing and projecting transversely beyond a surface of the rotor wing, said shaped member having a proximal region and a distal region, said distal region having a wave configuration having a plurality of waves which are curved to follow the wing shape and formed in the region of the rear edge of the wing, the wave configuration not extending over the entire transverse axis of the rotor wing.

2. A rotor blade in accordance with claim 1, wherein the shaped member is made as an aerodynamically shaped-matched plate which is set at an angle $\alpha \geqq 90°$ to a rotor blade surface.

3. A rotor blade in accordance with claim 1, wherein the shaped member is made as an aerodynamically shaped-matched plate which is set at an angle $\beta \leqq 90°$ within the plane set up by the rotor blade with respect to the longitudinal axis.

4. A rotor blade in accordance with claim 1, wherein the rotor blade consists of a plastic shaped member.

5. A rotor blade in accordance with claim 1, wherein the shaped member is made as an aerodynamically shaped-matched plate which is set at an angle $\alpha \geqq 90°$ to a rotor blade surface, the shaped member further set at an angle $\beta \leqq 90°$ within the plane set up by the rotor blade with respect to the longitudinal axis and alignment of the shaped member with respect to angle α, angle β or both angle α and angle β is variable with respect to the rotor blade.

6. A rotor blade in accordance with claim 1, wherein a plurality of shaped members are arranged next to one another along the rotor blade.

7. A rotor blade in accordance with claim 1, wherein the rotor blade surface has raised portions and recessed portions.

8. A rotor blade comprising a rotor wing having a longitudinal axis along the length of the rotor wing and an axis transverse to the longitudinal axis, the transverse axis extending between a front edge and a rear edge of the rotor wing, the longitudinal axis and transverse axis together defining a plane; and a shaped member mounted along the transverse axis and substantially orthogonal to the plane, the shaped member having a rear edge extending past the rear edge of the rotor wing, the rear edge of the shaped member having a wave configuration.

9. A rotor blade according to claim 8 wherein intersection of the shaped member with the plane of the rotor wing is defined by an angle $\alpha \geqq 90°$.

10. A rotor blade according to claim 8 wherein intersection of the shaped member with the longitudinal axis is defined by an angle $\beta \leqq 90°$.

11. A rotor blade according to claim 8, further comprising a plurality of shaped members arranged in close proximity to one another along at least a portion of the length of the rotor wing at the rear edge of the rotor wing.

12. A rotor blade according to claim 9, wherein angle α is variable.

13. A rotor blade according to claim 10, wherein angle β is variable.

14. A rotor blade according to claim 8 wherein the wave configuration incorporates a plurality of waves.

\* \* \* \* \*